United States Patent [19]
Meyer

[11] 3,878,790
[45] Apr. 22, 1975

[54] SEISMIC BLASTER CIRCUIT

[75] Inventor: Herbert Joram Meyer, Houston, Tex.

[73] Assignee: Texaco Inc., New York, N.Y.

[22] Filed: Aug. 7, 1970

[21] Appl. No.: 61,965

[52] U.S. Cl.............. 102/70.2 R; 317/80; 181/116; 307/301
[51] Int. Cl............................ F23q 7/00; G01v 1/06
[58] Field of Search................. 181/.5 NC, .5 XC; 102/70.2; 307/294, 252 A, 301, 252.51; 328/67; 315/241; 317/80

[56] References Cited
UNITED STATES PATENTS

| | | | |
|---|---|---|---|
| 3,324,779 | 6/1967 | Nobusawa et al................. | 307/301 |
| 3,377,125 | 4/1968 | Zielinski...................... | 307/252.51 |
| 3,502,943 | 3/1970 | Wechsler..................... | 315/241 X |
| 3,517,255 | 6/1970 | Hoffer et al.................. | 315/241 X |
| 3,548,749 | 12/1970 | Dreitzler....................... | 102/70.2 |

*Primary Examiner*—Maynard R. Wilbur
*Assistant Examiner*—H. A. Birmiel
*Attorney, Agent, or Firm*—Thomas H. Whaley; Carl G. Ries

[57] ABSTRACT

An electronic shooting circuit for seismic operations. It employs a silicon controlled rectifier for delivering maximum current instantaneously to one or more electric blasting caps that are being detonated.

5 Claims, 1 Drawing Figure

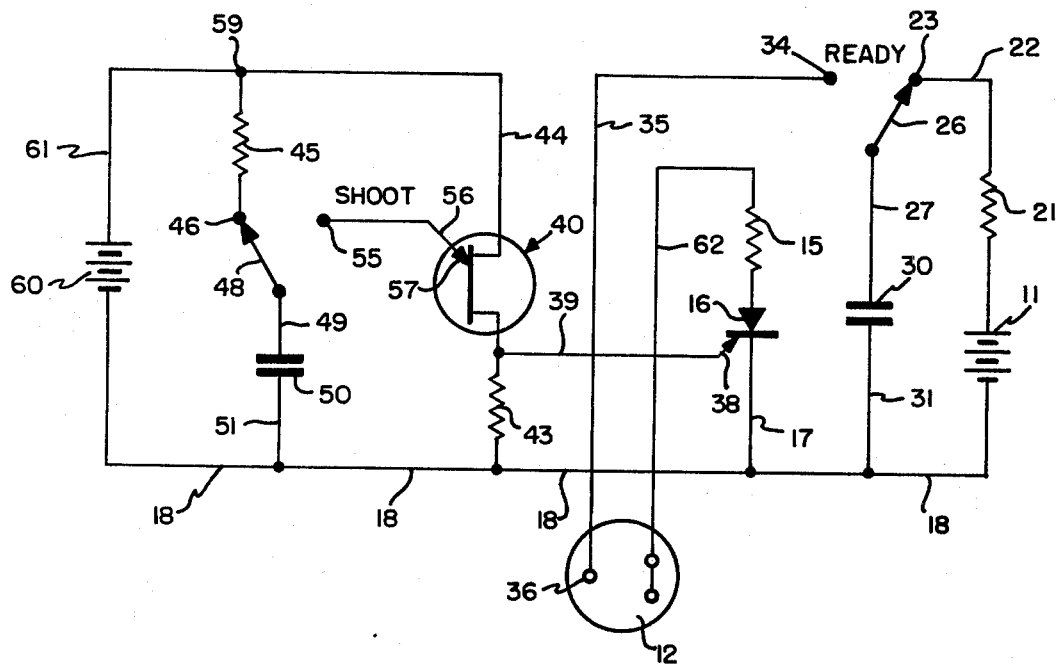

3,878,790

SEISMIC BLASTER CIRCUIT

BACKGROUND OF THE INVENTION

1. Field of the Invention

This invention relates to seismic operations in general and particularly concerns an electric circuit for providing improved detonation action in connection with seismic blasting. In seismograph exploration, a record is made of the time of detonation of an explosive charge, and it is measured with a high degree of accuracy. Consequently, it is important to be able to record the time clearly without ambiguity.

2. Description of the Prior Art

Heretofore it has been customary to employ manual switches, or relays for making the connection of a source of EMF, (e.g. a battery) to the electrical detonation of an explosive cap. Such arrangement has had drawbacks concerning switch contacts and the action which relates to a variable resistance effect at the instant of closing of the switch contacts. The result has been that timing of the instant of detonation of a seismic charge has not been as accurate as is desirable. This is so since the recording of the instant of detonation involving making an oscillogram which records the instantaneous current flow in the cap circuit that shows when the charge has been detonated, i.e., at the beginning of a record. Under such conditions when a manual switch, or relay, closes its contacts to apply an EMF to the circuit of one or more blasting caps, for detonating same, there has been too frequently a somewhat fuzzy record of the so-called time break. Consequently the initial timing of the charge detonation for a seismic record has been made subject to some undesirable error. Consequently, it is an object of this invention to provide an improved blaster circuit that has electronic controls so as to provide a constant and sharp instantaneous current flow and thus provide an improved time break signal.

While solid state electronic elements have been employed in igniting firing devices in the past, this has concerned timing of individual ignitions where a plurality of such ignitions are desired in a timed sequence.

SUMMARY OF THE INVENTION

Briefly, the invention concerns a blaster circuit for seismic operations. It comprises in combination a shooting capacitor having sufficient capacity to fire a substantial number of blasting caps, and first circuit means for connecting a source of EMF across said shooting capacitor for charging same. It also comprises second circuit means for connecting said blasting caps across said shooting capacitor in series with electronic gate means for permitting maximum flow immediately when said gate is opened, and it comprises a switch for alternatively completing said first or said second circuit means.

BRIEF DESCRIPTION OF THE DRAWINGS

The foregoing and other objections and benefits of the invention will be more fully set forth below in connection with the best mode contemplated by the inventor or carrying out the invention, and in connection with which there are illustrations provided in the drawing, wherein:

The FIGURE of drawings illustrates an electric blasting circuit according to the invention.

DESCRIPTION OF THE PREFERRED EMBODIMENT

Referring to the figure of drawing, it is to be noted that there is a blaster circuit shown, which illustrates a modification according to the invention. The circuit includes a relatively high voltage source of EMF 11 which is illustrated as being a DC battery. It will be understood that this may be any feasible source of EMF, such as the power supply for a seismic radio unit (not shown) or other communications equipment (not shown) which might take the form of a motor-generator unit or the like. In modern seismic operations there is often a substantial plurality of explosive charges detonated simultaneously to provide pattern seismic energy, and consequently, the voltage employed must be high enough to insure adequate power for detonation of all of the explosive caps. Thus, for example the voltage employed for an EMF source 11 when using the illustrated circuit, was 270 volts DC.

The shooting circuit per se includes the blasting caps (not shown). These will be connected in parallel across exterior connector terminals (not shown) that lead to a plug 12. Such exterior terminals are for making the physical connections to the cap wires in a standard manner outside of the blaster circuit. One side of the plug circuit is connected to one end of a resistor 15. The other end of resistor 15 is connected to the anode of a silicon controlled rectifier 16. The cathode of SCR 16 is connected via a circuit wire 17 to a common circuit wire 18. It is pointed out that throughout this description the abbreviation SCR is used to designate the terms silicon controlled rectifier.

The common circuit wire 18 has one side of the EMF source, e.g. battery 11 connected thereto. The other side of battery 11 is connected to one end of a resistor 21 that is in the charging circuit of a shooting capacitor 30. The other end of resistor 21 is connected over a wire 22 to a stationary contact 23 of a so-called "Ready" switch 26. The movable contact of switch 26 is connected to a common circuit which goes via a wire 27 to one side of the shooting capacitor 30. The other side of capacitor 30 is connected to the common circuit wire 18 via another wire 31. This completes the charging circuit for the capacitor 30 from the source of EMF 11, when the switch 26 is in the position that is illustrated in the drawing.

There is another stationary contact 34 on the switch 26. This is connected via a circuit wire 35 to one of the connector elements of plug 12. That connector element 36 in turn, leads to an external connecting circuit as indicated above.

The SCR 16 has a control electrode 38, to which is connected a circuit wire 39. The wire 39 leads to one terminal of a unijunction transistor 40, to which terminal there is also connected a resistor 43. The other end of resistor 43 is connected to the common circuit wire 18.

The unijunction transistor 40 has another principal electrode that is connected via a circuit wire 44 to one end of a resistor 45. Resistor 45 is in a shooting control circuit and thus is connected to a stationary terminal 46 of a switch 48. Switch 48 has its movable contact connected to a common circuit that consists of a wire 49 leading to one side of a capacitor 50. The other side of capacitor 50 is connected to the common circuit wire 18 via another wire 51.

When the switch 48 is in its other position from that illustrated, it connects the capacitor 50 to a stationary contact 55, to which is connected a circuit wire 56 that leads to a control electrode 57 of the transistor 40.

In addition, there is a low voltage potential that is supplied to the shooting control circuit. This may employ a battery 60 that is connected from a common connection point 59 to which the resistor 45 is connected as well as one electrode of transistor 40. Battery 60 is connected to the connection point 59 via a circuit wire 61. The other side of battery 60 is connected to the common circuit wire 18, as illustrated. Also, it may be recalled that the common circuit 18 is connected to one side of capacitor 50 via the wire 51.

Operation

In operating the seismic blasting circuit which has been illustrated and described above, the procedure is briefly as follows: First, having cleared the shooting and control circuits, and after having connected the blasting caps (not shown) to the external connector circuit (described above) that leads to the plug 12, the shooting or blasting procedure will be ready to go. It will be appreciated by anyone skilled in this art that there will be safety arrangements such as customary interlocks (not shown) to prevent premature detonation of the blasting caps. Also, the shooting and control circuit clearing is accomplished by insuring that the switches 26 and 48 are in the illustrated positions thereof. Following the foregoing preliminaries, it will be noted that the capacitor 30 (which provides shooting current to detonate the blasting caps) will be charged to the voltage of EMF source 11. Similarly, switch 48 will be in the illustrated position and the low voltage shooting control circuit will cause capacitor 50 to be charged to the voltage of battery 60.

Thereafter, when the recording equipment is ready and a signal given, the shooting preliminary or ready procedure will be carried out by first shifting switch 26 to the other position (close contact 34) for placing it in the ready condition. Then there is a circuit completed that provides a discharge path for capacitor 30, which may be traced from the upper plate (as illustrated in the drawing) of capacitor 30 to the switch 26. Then it continues via stationary contact 34 (now connected) over wire 35 to one connector of the plug 12. It continues across one or more heating elements of the blasting caps and back through the plug 12 via a circuit wire 62 to one end of the resistor 15. The other end of resistor 15 connects directly to the anode of the SCR 16, while the cathode of the SCR is connected over wire 17 to the common wire 18 that leads back via wire 31 to the lower plate of the shooting capacitor 30.

When the shooting signal is given, the detonation of the blasting caps will take place. And, it will take place with a maximum instantaneous current flow through the prepared circuit, just traced above. The instant when such current flow occurs is controlled by, and takes place upon the instant when a sufficient potential is applied to the electrode 38 that controls conduction of the SCR 16.

Application of a potential to the control electrode 38 of the SCR 16, made by having the wire 39 connected to one end of the resistor 43. The other end of this resistor 43 is connected to the common circuit wire 18. Thus, when current flows through transistor 40, it provides an IR drop across resistor 43, and this creates the potential that is applied to control electrode 38.

Control of the conduction of transistor 40 is carried out by providing a discharge path for the capacitor 50, which includes the electrode 57 of transistor 40. Thus, when the "shoot" signal is given, switch 48 will be shifted to the other position (from that illustrated) so that stationary contact 55 is connected to the upper plate (as illustrated in the drawing) of capacitor 50. Then, the discharge of capacitor 50 will cause transistor 40 to conduct and the current that flows therethrough (as determined by the battery 60) will also flow through the resistor 43.

It is to be observed that the foregoing circuit when operated as described will provide a superior blasting action for seismic blasting operations, since the current flow will be instantaneously maximum so as to provide a superior time break signal. An example of particular circuit constants that have been employed successfully includes the following: a shooting capacitor 30 having a rating of 125 microfarads; and a DC source of EMF 11 equal to 270 volts. Using those elements the system easily detonated 20 blasting caps under adverse conditions, i.e. with 100 ohms in the cap wire connections.

While a particular embodiment of the invention has been described above in considerable detail in accordance with the applicable statutes, this is not to be taken as in any way limiting the invention, but merely as being descriptive thereof.

I claim:

1. Blaster circuit for seismic operations, comprising in combination
    a shooting capacitor having sufficient capacity to fire a substantial number of blasting caps,
    first alternative circuit means for connecting a source of e.m.f. across said shooting capacitor for charging same,
    second alternative circuit means for connecting said blasting caps across said shooting capacitor in series with electronic gate means for permitting maximum current flow immediately when said gate is triggered, and
    a single-pole double-throw switch for alternatively completing said first or second circuit.

2. Blaster circuit according to claim 1 wherein said electronic gate means comprises a silicon controlled rectifier having a control electrode, and
    means for applying a potential to said control electrode to trigger said gate 3. Blaster circuit according to claim 2 wherein said potential applying means comprises
    (a) a source of low e.m.f.,
    (b) a capacitor,
    (c) a unijunction transistor connected across said source of low e.m.f., and
    (d) third circuit means for connecting said capacitor (b) to said transistor (c), and
    (e) fourth circuit means for connecting said transistor (c) to said control electrode of said silicon controlled rectifier in order to trigger said rectifier.

4. Blaster circuit according to claim 3, wherein said potential applying means also comprises
    (f) a second switch for alternatively connecting said capacitor (b) across said source of low e.m.f. (a) to charge it to that potential, or for connecting said capacitor (b) to an electrode of said transistor (c) to cause it to conduct.

5. Seismic blaster circuit comprising in combination 1. a shooting capacitor having sufficient capacity to fire a substantial plurality of blasting caps,
2. first circuit means for connecting a source of DC potential across said shooting capacitor 1 for charging same,
3. a silicon controlled rectifier having a control electrode,
4. a cap circuit plug for connecting said plurality of blasting caps in series with said rectifier 3,
5. second circuit means for connecting said rectifier 3 in series with said plug 4 and said capacitor 1,
6. a first switch for alternatively completing said first 2 or said second 5 circuit means,
7. means for applying a potential to said control electrode of said rectifier 3 comprising
8. a low voltage source,
9. a unijunction transistor having an electrode and being connected across said source 8 and including a series resistor therewith,
10. third circuit means for connecting said control electrode of said rectifier 3 to one end of said series resistor 9,
11. a second capacitor,
12. fourth circuit means for connecting said second capacitor 11 to said unijunction electrode 9,
13. fifth circuit means for connecting said second capacitor 11 across said source 8 for charging same, and
14. a second switch for alternatively completing said fourth 12 or said fifth 13 circuit means whereby application of said potential 7 will trigger said rectifier 3 and discharge said shooting capacitor 1 when said first switch 6 is in position to complete said second circuit means 5.

* * * * *